(12) United States Patent
Wang

(10) Patent No.: US 6,402,093 B1
(45) Date of Patent: Jun. 11, 2002

(54) METHOD AND APPARATUS FOR AUTONOMOUS DE-ICING

(75) Inventor: Sheng T. Wang, Fort Worth, TX (US)

(73) Assignee: Lockheed Martin Corporation, Fort Worth, TX (US)

( * ) Notice: Subject to any disclaimer, the term of this patent is extended or adjusted under 35 U.S.C. 154(b) by 5 days.

(21) Appl. No.: 09/615,135

(22) Filed: Jul. 13, 2000

(51) Int. Cl.$^7$ ................................................. B64D 15/16
(52) U.S. Cl. ............................. 244/134 R; 244/134 A; 244/134 D
(58) Field of Search .................... 244/134 R, 134 A, 244/134 D

(56) References Cited

U.S. PATENT DOCUMENTS 5,326,051 A * 7/1994 Pisarski .................. 244/134 D
6,027,075 A 2/2000 Pentrenko ............... 244/134 R

FOREIGN PATENT DOCUMENTS

GB 2252285 * 8/1992 ............. 244/134 D

OTHER PUBLICATIONS

Science Daily, To Prevent Ice Buildup, Charge It; Dartmouth College; Apr. 1, 1998.

* cited by examiner

Primary Examiner—Galen L. Barefoot
(74) Attorney, Agent, or Firm—Bracewell & Patterson LLP

(57) ABSTRACT

A dielectric coating is applied to a surface that is prone to icing. Ice detecting sensors are deployed over the surface that is in danger of excessive icing. When sensors detect the presence of ice, a charge opposite that of the ice coating is automatically applied to the surface beneath the dielectric coating. Since ice in its natural state is a negatively charged substance, an identical, negatively charged surface repels or loosens the ice.

14 Claims, 4 Drawing Sheets

METHOD AND APPARATUS FOR AUTONOMOUS DE-ICING

BACKGROUND OF THE INVENTION

1. Technical Field

The present invention generally relates to ice formation on aerodynamic surfaces and in particular to icing on airplanes. Still more particularly, the present invention relates to removal of ice formed on the wings of airplanes.

2. Description of the Related Art

A big problem associated with airplanes is wing icing. Frequently, there are incidents related to wing icing on commercial aircraft. Excessive ice on wings endangers the aircraft and its passengers because the ice reduces the airfoil efficiency of the wing. Methods for dealing with ice adhesion on aircraft vary, though most techniques involve some form of scraping, melting or breaking. For example, the aircraft industry utilizes a de-icing solution such as Ethyl Glycol to douse aircraft wings to melt any ice accumulation. The process is both environmentally hazardous and costly. Some aircraft have permanently installed de-icing mechanisms such as a rubber "boot" aligned along the leading edge of the aircraft wing. The tube is inflated during flight or on the ground whenever icing conditions warrant. This action causes any ice accumulation to break and fall off. Jet aircraft may redirect engine heat onto the wing so as to melt the ice or use heating elements to melt the ice.

Propeller driven aircraft are unable to duct heat to the wing surface and rubber boots on the leading edge of wings are not aerodynamically efficient. Also, de-icing costs are extremely high, at $2500–$3500 per application, and depending on conditions, they could be applied up to ten times a day on some aircraft.

Therefore there exists a need to provide an apparatus and method to efficiently and automatically remove ice from aircraft wings. It would further be desirable to remove ice without the need for chemicals, boots or heating elements.

SUMMARY OF THE INVENTION

A dielectric coating is applied to a surface that is prone to icing. Ice detecting sensors are deployed over the surface that is in danger of excessive icing. When sensors detect the presence of ice, a charge opposite that of the ice coating is automatically applied to the surface beneath the dielectric coating. Since ice in its natural state is a negatively charged substance, an identical, negatively charged surface repels or loosens the ice.

Ice has certain physical properties which allow the present invention to selectively modify the adhesion of ice to conductive surfaces. First, ice is a protonic semiconductor, a small class of semiconductors whose charge carriers are protons rather than electrons. This phenomenon results from hydrogen bonding within the ice. Hydrogen bonding occurs because the hydrogen atoms of water molecules in ice share electrons with an oxygen atom. Thus, the nucleus of the water molecule - uniquely a single proton remains available to bond with adjacent water molecules.

Similar to typical electron-based semiconductors, ice is electrically conductive. While this electrical conductivity is generally weak, the conductivity can be altered by adding chemical agents that donate or accept extra charge-carrying particles, i.e., protons in the case of ice. Another physical property of ice is its "evaporability." Evaporability of a substance is a function of vapor pressure at the substance surface. In most materials, vapor pressure drops rapidly at the liquid-to-solid interface. In ice, however, there is virtually no change in vapor pressure at the liquid-to-solid interface. The reason for this is that the surface of ice is covered with a liquid-like layer ("LLL").

The LLL has important physical characteristics. First, the LLL is only nanometers thick. Second, it ranges in viscosity from almost water-like, at temperatures at or near to freezing, to very viscous at lower temperatures. Further, the LLL exists at temperatures as low as −100 degrees centigrade. The LLL is also a major factor of ice adhesion strength. The LLL functions as a wetting substance between the surfaces--the principle behind almost all adhesives--and substantially increases the effective contact area between the surfaces. This increase in contact area strongly affects ice adhesion.

Generally, water molecules within a piece of ice are randomly oriented. On the surface, however, the molecules are substantially oriented in the same direction, either outward or inward. As a result, all their protons, and hence the positive charges, either face outward or inward.

While the exact mechanism is unknown, it is likely that the randomness of water molecules transitions to an ordered orientation within the LLL. However, the practical result of the ordering is that a high density of electrical charges, either positive or negative, occurs at the surface. Accordingly, if a charge is generated on the surface coming in contact with ice, it is possible to selectively modify the adhesion between the two surfaces. As like charges repel and opposites attract, an externally applied electrical bias to the surface that matches that of the charge occurring in the LLL reduces the adhesion between ice and the surface.

The present embodiment provides a power source connected for applying a DC potential across a dielectric coating formed on the surface. When ice forms on the dielectric coating, a charge is set up by the ice that is opposite to that of the surface beneath the dielectric. Sensors detect the ice formation and cause the power source to reverse polarity, which reduces the adhesion of the ice to the surface.

The above as well as additional objectives, features, and advantages of the present invention will become apparent in the following detailed written description.

DETAILED DESCRIPTION OF THE PREFERRED EMBODIMENT

Figure 1:
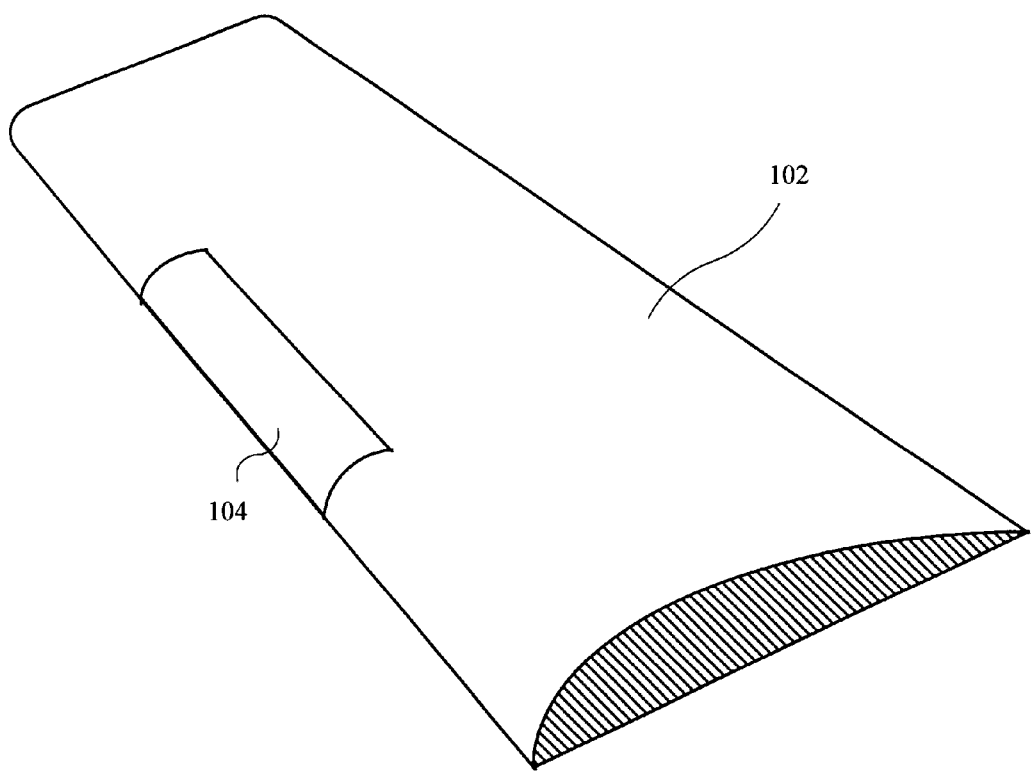
FIG. 1 is a perspective that depicts the leading edge of a wing with a dielectric coating for de-icing in accordance with a preferred embodiment of the present invention.

With reference now to the figures, and in particular with reference to FIG. 1, the leading edge of a wing with a dielectric coating for de-icing in accordance with a preferred embodiment of the present invention is depicted. Wing 102 is shown with dielectric coating 104 applied to the leading edge. Not shown, but detailed in FIG. 2, are sensors that detect the presence of ice. When ice forms on dielectric 104, the sensors signal a charging circuit (not shown) connected to the wing. In the present embodiment the ice detector is comprised of exposed conductors that, when covered by ice or water, exhibit a change in conductivity. This change in conductivity is detectable and is used to determine whether ice is covering a particular area.

When ice covers the coated surface, including the sensors, conductivity between the individual conductors increases. In one embodiment a wheatstone bridge circuit, utilizing the sensors as one of the branches of the circuit, can be used to detect conductivity changes. If a change in conductivity is detected, the charging circuit automatically reverses polarity of the charge on the wing surface to match the polarity of the charge due to the ice coating. The reversal in polarity of the wing surface causes the polarity of dielectric 104 to change and match that of the ice coating. Since like charges repel, this reduces the adhesion of the ice to the wing and the charged dielectric surface repels the ice.

Figure 2B:
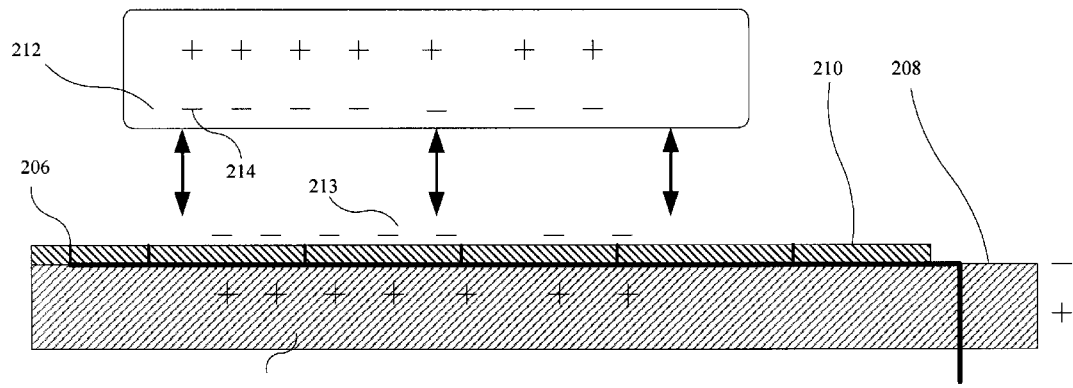
FIG. 2B illustrates the repelling action caused by polarity reversal in accordance with a preferred embodiment of the present invention.
Figure 2A:
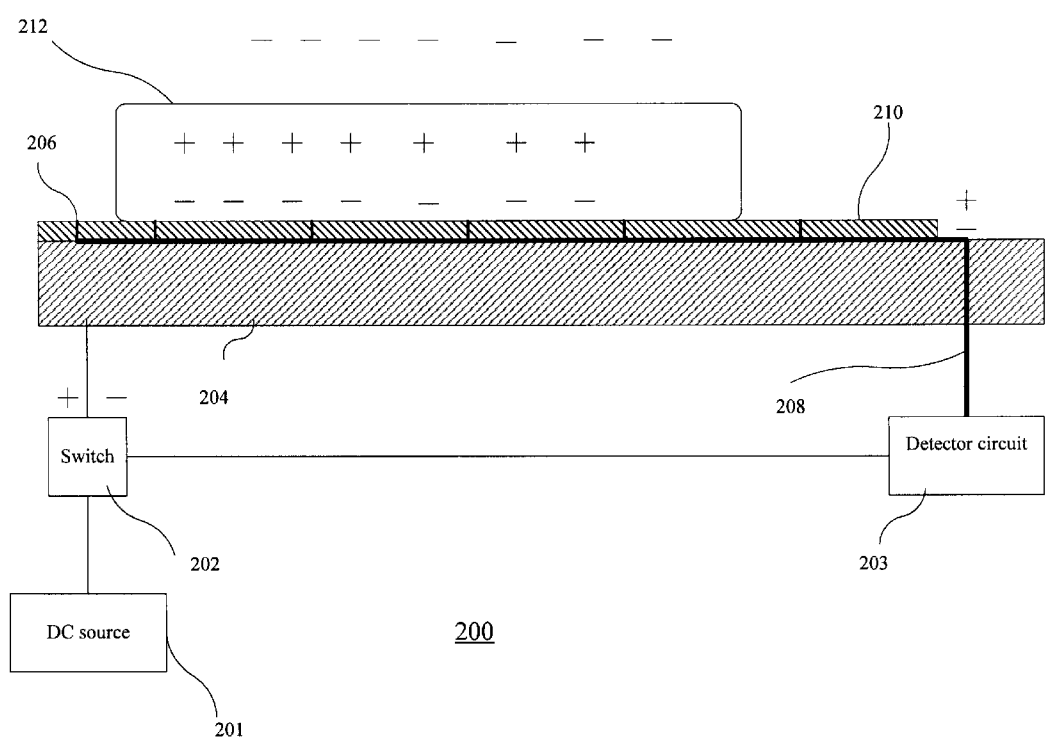
FIG. 2A is a cross-sectional view of the wing of FIG. 1, illustrating a system for de-icing a surface in accordance with a preferred embodiment of the present invention.

Referring now to FIG. 2A, a system for de-icing a surface in accordance with a preferred embodiment of the present invention is illustrated. De-icing system 200 is shown installed on a wing surface to be de-iced. De-icing system 200, in the present embodiment, comprises sensors 206, dielectric coating 210, DC power source 201, detection circuit 203 and switch 202. In this embodiment, the surface is a wing surface and a cross-section of the installation shows wing surface 204. Ice detectors 206 (described in FIG. 1) are shown connected to return cable 208. When ice 212 forms on dielectric 210, conductivity between detectors 206 increases due to the ice buildup. This buildup causes a signal to be sent to detection circuit 203. Detection circuit 203 compares the conductance (in another embodiment, the resistance between detectors is compared and in a further embodiment the capacitance of the dielectric material is measured). An increase in conductance indicates the presence of ice 212.

The buildup of ice 212 also carries an innate charge, in this case a negative charge, on the boundary between ice 212 and dielectric 210. At first, the negative charge of the ice boundary causes an attraction between ice 212 build up and dielectric 210. This increases the adhesion of ice 212 to dielectric 210. Dielectric 210 can be any material that has dielectric properties and one such material is Radar Absorbing Material (RAM). RAM is a thin coating which has a high dielectric strength and is used on aircraft to reduce radar detection.

Detectors 206 are installed in dielectric 210 prior to installation. The ends of detectors 206 are exposed and flush with the surface of dielectric 210. Conductor 208 is connected to all detectors 206, and each detector is isolated from wing surface 204 and dielectric 210 upon installation. Conductor 208 is connected to detection circuit 203. Additionally, charging source 202 is connected to wing surface 204 and to a switching circuit 202 that is used to change the polarity of wing surface 204 directly, and indirectly, the polarity of dielectric 210. When detectors 206 are covered with ice 212, conductivity between the individual detectors that are covered with ice increases. A signal is sent to ice detector circuit 203 which then causes charging source 202 to automatically reverse polarity of wing 204. As is well known in the art, surface charges with the same polarity repel and surface charges with the opposite polarity attract each other.

FIG. 2B illustrates the repelling action caused by polarity reversal, in accordance with a preferred embodiment of the present invention. Wing surface 204 automatically changes polarity from, in the present embodiment, a positive polarity to a negative polarity in response to potential applied to wing surface 204 from DC source 201. This causes the polarity of the surface of dielectric 210 to also reverse from a positive polarity to a negative polarity. Ice 212, having negative polarity 214 at the boundary to dielectric 210 and ice 212, is then repelled by negative polarity 213 of dielectric 210. This repulsion causes the adhesion between ice 212 and the dielectric 210 to reduce and actually begin movement of ice 212 away from dielectric 210.

Figure 3:
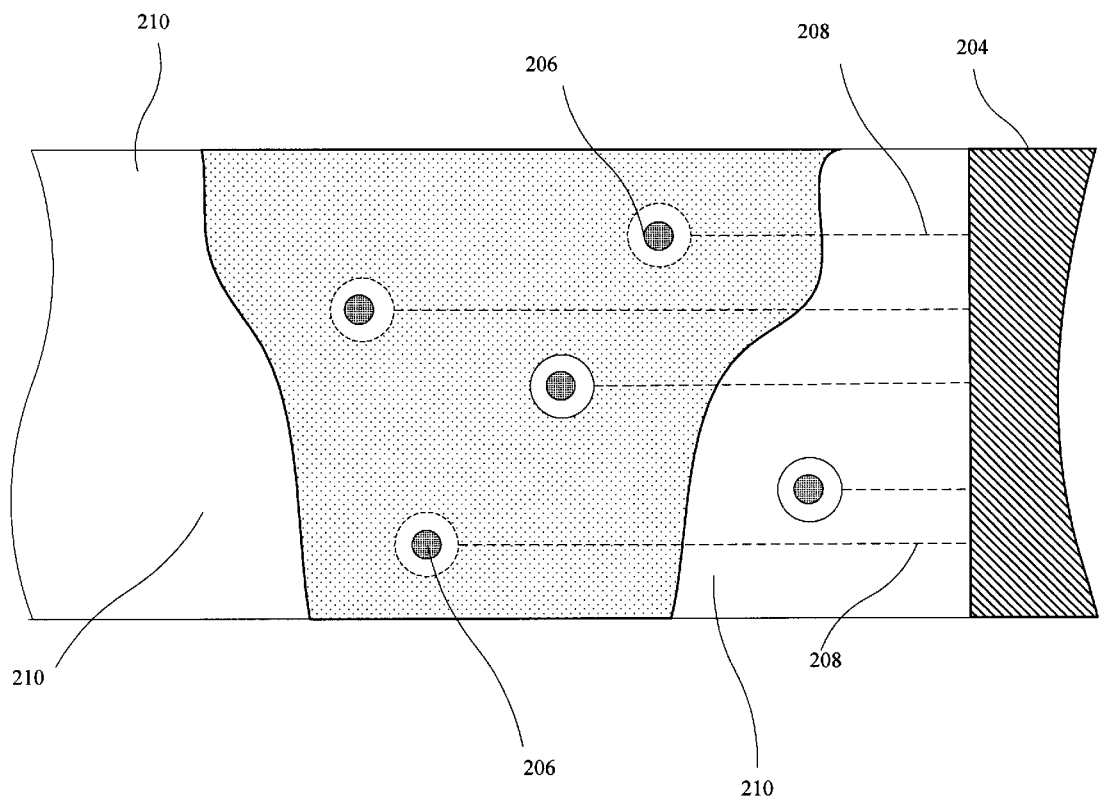
FIG. 3 is a top view of the wing and system shown in FIG. 2A in accordance with a preferred embodiment of the present invention.

FIG. 3 is a top view of the wing and system shown in FIG. 2A in accordance with a preferred embodiment of the present invention. Wing surface 204 is coated by dielectric 210. Ice detectors 206 are connected with the detector circuit via conductors 208. Conductivity is determined between the various detectors 206. If the conductivity is low to zero, there is either no or very little ice covering the dielectric 210. If the conductivity is high, there is ice covering at least two of ice detectors 206.

Figure 4:
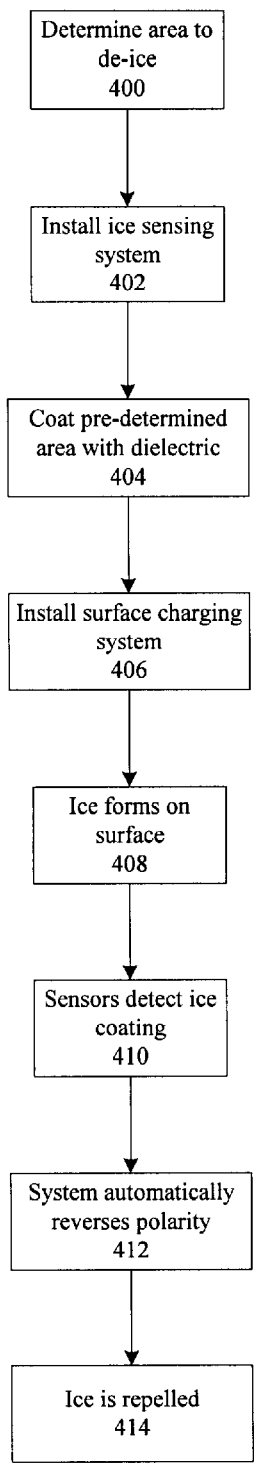
FIG. 4 is a high-level flow diagram that depicts a method for de-icing a surface in accordance with a preferred embodiment of the present invention.

Referring now to FIG. 4, a method for de-icing a surface in accordance with a preferred embodiment of the present invention is depicted. A more complete understanding of the method for de-icing is obtained by viewing FIG. 3 in conjunction with FIG. 4. The process begins with step 400 which depicts a determination of the area to be controlled by the deicing mechanism. The process proceeds to step 402, which illustrates ice detectors 206 being installed. In this embodiment, ice detectors 206 are the exposed ends of conductive wires that are used to measure conductivity or resistance and are connected to the detecting instrument via ribbon conductors 208. The process passes to step 404, which depicts RAM coating 210 being applied to a surface that will be de-iced by the present invention. The RAM coating 210 completely covers all but the exposed ends of ice detectors 210. Generally, RAM 210 is applied on specific, strategic sections of a wing for radar avoidance. In this application, RAM 210 may be applied in locations on the wing that are prone to ice build-up.

The process continues to step 406, which illustrates installation of the wing surface charging system. The charging system is a low voltage, low direct current charging source with a switching circuit that is capable of being automatically reversed upon receiving an appropriate signal from the ice detecting instrument. The process then passes to step 408, which depicts ice formation on the wing surface. This step occurs when the wing surface is in flight and subject to ice formation. The process proceeds to step 410, which illustrates the ice detection system detecting the ice build up and a further comparison of the conductivity between ice detectors 206 and the detection system sending a signal to the charging source.

The process continues to step 412 which depicts the charging source, in response to the signal, reversing polarity on the wing surface. The charging source maintains the new polarity on the wing surface, until the ice begins to separate from the surface. A decrease in conductivity between ice detectors 206 indicates loss of ice coverage on the dielectric 210 and causes detector circuit 203 to signal switch 202 to return to the old polarity. The method then passes to step 414, which illustrates the ice being repelled from the wing surface. Generally, the time required for the ice coating to separate from the wing surface is short, measured in milliseconds, due to the wind speed over the wing surface. The number of times the polarity is reversed depends on whether ice is still detected on the wing surface. If ice is detected, detector circuit 206 causes the switch to change polarity of the wing surface from positive to negative until no ice is detected. The DC source then returns to maintaining a normal, positive polarity of the wing surface.

Alternatively, a timer can be included that causes polarity to reverse periodically for a predetermined period of time. As described above, the time for each period of polarity reversal can be very short. In addition, the system may be manually operated by an aircraft operator. For instance, in case the ice detectors fail and ice is observed coating the wing, the system may be manually overridden. The polarity is switched from positive to negative and back until the ice separates from the wing surface.

The present embodiment provides a power source for applying a DC potential across a dielectric coating formed on the surface. The potential reverses polarity on the dielectric coating and repels ice from the surface of the coating. Rather than distorting the airfoil to separate the ice utilizing a rubber boot, as in the current art, the present invention causes the innate polarity of the ice to cause separation. The invention operates automatically upon sensing the presence of ice. Also, a manual override can be provided to activate the polarity reversal according to observed icing conditions. No expensive chemicals are necessary because the adhesion of the ice is reduced so that the ice may be easily removed without harm to the wing surface.

While the invention has been particularly shown and described with reference to a preferred embodiment, it will be understood by those skilled in the art that various changes in form and detail may be made therein without departing from the spirit and scope of the invention.

What is claimed is:

1. A method for de-icing a surface, comprising the steps of:

coating said surface with a dielectric;

connecting a charging source to said surface to cause said surface to have a potential with a positive polarity;

utilizing said charging source to reverse said positive polarity of said surface to a negative polarity when ice forms on said dielectric coated surface.

2. The method of claim 1, further comprising:

installing ice detecting sensors on said surface to determine ice formation.

3. The method of claim 2, wherein installing said ice detecting sensors on said surface to determine ice formation, further comprises:

utilizing conductivity measuring ice detecting sensors.

4. The method of claim 2, further comprising:

responsive to a signal from said sensors, automatically activating said charging source.

5. The method of claim 1, further comprising:

reversing polarity of said surface for a predetermined period of time; and reverting to the original said surface polarity at the end of said time period.

6. The method of claim 1, further comprising:

manually activating said charging source upon observation that ice is forming on said dielectric coated surface.

7. A system for de-icing a surface of an aircraft:

a dielectric coating adapted to be applied to a surface to be deiced;

a charging source adapted to be connected to said surface for applying a positive electrical potential to said surface;

a switch connected to said charging source for automatically reversing the polarity of said electrical potential applied to said surface when ice forms on said dielectric coated surface.

8. The system of claim 7, further comprising:

ice detecting sensors adapted to mount on said surface for detecting the formation of ice.

9. The system of claim 8, further comprising:

signaling means for sending a signal from said sensors, to automatically activate said charging source.

10. The system of claim 7, wherein said switch may automatically reverse polarity of said surface for a predetermined period of time, and reverts to a positive polarity at the end of said time period.

11. The system of claim 1, further comprising:

a plurality of electrical conductors adapted to be mounted to said surface, each of said plurality of conductors being insulated from the other; and a comparison circuit for measuring conductivity between any two said conductors to thereby detect ice formation.

12. An aircraft, comprising:

an airfoil;

a dielectric coating on at least a portion of said airfoil;

a plurality of ice detecting sensors for determining the presence of ice on said dielectric coating;

a charging source for applying a potential to said airfoil and to said dielectric coating; and a switch connected to said charging source and said ice detecting sensors for reversing said polarity of said airfoil and said dielectric coating to repel said ice from said dielectric coating.

13. The aircraft of claim 12, wherein said switch automatically reverses said polarity of said airfoil when ice is detected on said dielectric coating.

14. The aircraft of claim 12, wherein said charging source includes a switch for manually changing said polarity of said airfoil.

* * * * *